United States Patent
Iwamoto (10) Patent No.: US 11,048,929 B2
(45) Date of Patent: Jun. 29, 2021

(54) HUMAN BODY DETECTION APPARATUS, CONTROL METHOD FOR HUMAN BODY DETECTION APPARATUS

(71) Applicant: CANON KABUSHIKI KAISHA, Tokyo (JP)

(72) Inventor: Kazunari Iwamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 171 days.

(21) Appl. No.: 15/715,338

(22) Filed: Sep. 26, 2017

(65) Prior Publication Data
US 2018/0107870 A1 Apr. 19, 2018

(30) Foreign Application Priority Data

Oct. 14, 2016 (JP) .............................. JP2016-203031

(51) Int. Cl.
*G06K 9/00* (2006.01)
*G06K 9/62* (2006.01)
*G06K 9/46* (2006.01)

(52) U.S. Cl.
CPC .......... *G06K 9/00369* (2013.01); *G06K 9/46* (2013.01); *G06K 9/6262* (2013.01)

(58) Field of Classification Search
CPC ..... G06K 9/00369; G06K 9/46; G06K 9/6262
See application file for complete search history.

(56) References Cited

U.S. PATENT DOCUMENTS

| 2013/0064425 A1 | 3/2013 | Sagawa et al. |
| 2016/0180195 A1* | 6/2016 | Martinson ............ G06K 9/6256 |
| | | 382/103 |
| 2018/0089505 A1* | 3/2018 | El-Khamy ................ G06T 7/11 |

FOREIGN PATENT DOCUMENTS

| EP | 2381415 A1 | 10/2011 |
| JP | 2007274207 A | 10/2007 |
| JP | 2008250444 A | 10/2008 |
| JP | 2009135824 A | 6/2009 |
| JP | 2010086429 A | 4/2010 |
| JP | 2012-212968 A | 11/2012 |
| JP | 2013509786 A | 3/2013 |
| JP | 2013-061802 A | 4/2013 |

(Continued)

OTHER PUBLICATIONS

Bertozzi, Massimo, et al. "Pedestrian detection for driver assistance using multiresolution infrared vision." IEEE transactions on vehicular technology 53.6 (2004): 1666-1678. (Year: 2004).*

(Continued)

*Primary Examiner* — Nirav G Patel
(74) *Attorney, Agent, or Firm* — Carter, DeLuca & Farrell LLP (57) ABSTRACT

When detecting object areas, it is possible to appropriately evaluate each detection area regardless of the overlapping relationship and positional relationship between detection areas. A human body detection apparatus obtains an image captured by an imaging unit, detects, as detection areas, predetermined object areas from the captured image, and evaluates an evaluation target detection area by comparing, among the detection areas, the evaluation target detection area and other detection areas.

26 Claims, 6 Drawing Sheets

(56) References Cited

FOREIGN PATENT DOCUMENTS

WO 2016147653 A1 9/2016

OTHER PUBLICATIONS

Sun, Sun-Gu, et al. "Small target detection using center-surround difference with locally adaptive threshold." ISPA 2005. Proceedings of the 4th International Symposium on Image and Signal Processing and Analysis, 2005 . . . IEEE, 2005. (Year: 2005).*

Chen, Yuanyuan, et al. "A pedestrian detection and tracking system based on video processing technology." 2013 Fourth Global Congress on Intelligent Systems. IEEE, 2013. (Year: 2013).*

Japanese Office Action dated Sep. 10, 2018 in corresponding Japanese Patent Application No. 2016-203031 with English translation.

Derek Hoiem et al: "Putting Objects in Perspective", International Journal of Computer Vision, Kluwer Academic Publishers, BO, vol. 80, No. 1, Apr. 17, 2008 (Apr. 17, 2008), pp. 3-15, XP019616647, ISSN: 1573-1405.

Extended European Search Report issued in Appl. No. EP 17189300.1 dated Mar. 16, 2018 (7 pages).

Communication issued by the European Patent Office dated Jul. 1, 2019 in corresponding European Patent Application No. 17189300.1.

\* cited by examiner

HUMAN BODY DETECTION APPARATUS, CONTROL METHOD FOR HUMAN BODY DETECTION APPARATUS

BACKGROUND OF THE INVENTION

Field of the Invention

The present invention relates to a technique of detecting a human body by image processing.

Description of the Related Art

There is known a technique of detecting a specific object such as a person or car or a partial area of the object from an image. There is also known a technique of reducing a detection error when detecting an area including a specific object from an image. For example, Japanese Patent Laid-Open No. 2013-061802 discloses a method in which if detected object areas overlap each other, based on the overlapping state, it is determined whether each detection result indicates a detection error. Japanese Patent Laid-Open No. 2012-212968 discloses a method in which if another head area is detected within a predetermined distance from a detected head area, one of the detection results is disabled.

However, in the technique disclosed in Japanese Patent Laid-Open No. 2013-061802, two or more detected object areas need to overlap each other in order to determine whether each detected object area has been erroneously detected. In the technique disclosed in Japanese Patent Laid-Open No. 201-212968, it is considered that a head detection area falling within a predetermined range from a head detection area of interest has been erroneously detected, and thus it may be determined that a correct head detection area falling within the above-described predetermined range has been erroneously detected.

SUMMARY OF THE INVENTION

According to one aspect of the present invention, there is provided a human body detection apparatus comprising: an obtaining unit configured to obtain an image captured by an imaging unit; a detection unit configured to detect, as detection areas, human body areas from the captured image; and an evaluation unit configured to evaluate an evaluation target detection area by comparing, among the detection areas detected by the detection unit, the evaluation target detection area and a plurality of other detection areas.

According to another aspect of the present invention, there is provided a control method for a human body detection apparatus, comprising: obtaining an image captured by an imaging unit; detecting, as detection areas, predetermined object areas from the captured image; and evaluating an evaluation target detection area by comparing, among the detection areas, the evaluation target detection area and other detection areas.

According to another aspect of the present invention, there is provided a non-transitory computer readable storage medium storing a program for causing a computer to function as a human body detection apparatus including an obtaining unit configured to obtain an image captured by an imaging unit, a detection unit configured to detect, as detection areas, predetermined object areas from the captured image, and an evaluation unit configured to evaluate an evaluation target detection area by comparing, among the detection areas detected by the detection unit, the evaluation target detection area and a plurality of other detection areas.

Further features of the present invention will become apparent from the following description of exemplary embodiments (with reference to the attached drawings).

DESCRIPTION OF THE EMBODIMENTS

Embodiments will be described below with reference to the accompanying drawings.

First Embodiment

The first embodiment will describe a method of detecting, as detection areas, object areas included in an image, and determining, by comparing the feature amounts (for example, the sizes) of the respective detection areas, whether each detection area has been erroneously detected.

Figure 1:
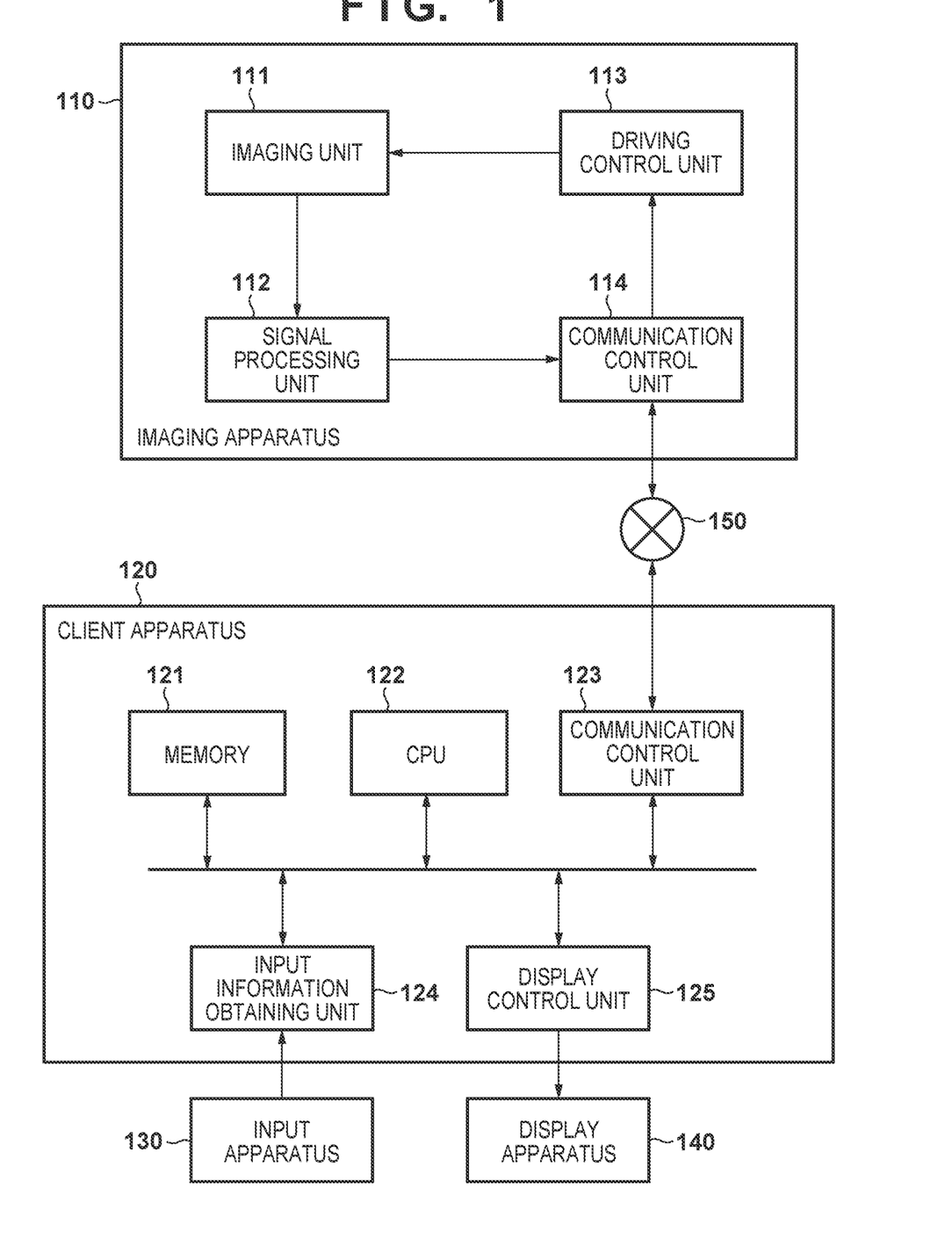
FIG. 1 is a block diagram for explaining a system.

FIG. 1 shows examples of the system arrangement and hardware arrangement of a system according to the first embodiment. Referring to FIG. 1, an imaging apparatus 110 performs imaging. A client apparatus 120 serving as a human body detection apparatus drives the imaging apparatus 110, and obtains and analyzes a captured image. An input apparatus 130 is formed from a mouse, a keyboard, and the like. A display apparatus 140 displays an image output from the client apparatus 120. Note that FIG. 1 shows the client apparatus 120 and the display apparatus 140 as independent apparatuses. However, the present invention is not limited to this. For example, the client apparatus 120 and the display apparatus 140 may be integrally arranged, the input apparatus 130 and the display apparatus 140 may be integrally arranged, or the client apparatus 120, the input apparatus 130, and the display apparatus 140 may be integrally arranged.

A network 150 connects the imaging apparatus 110 to the client apparatus 120. The network 150 is formed from a plurality of routers, switches, and cables satisfying a communication standard such as Ethernet®. Note that in this embodiment, the communication standard, scale, and arrangement of the network 150 are arbitrary as long as it is possible to perform communication between the imaging apparatus 110 and the client apparatus 120. For example, the network 150 may be formed by the Internet, a wired LAN (Local Area Network), a wireless LAN, a WAN (Wide Area Network), or the like.

The arrangement of the imaging apparatus 110 will be described. An imaging unit 111 includes an image sensor and an optical system, and forms an image of an object on the image sensor by setting, as an imaging center, the intersection point of the image sensor and the optical axis of the optical system. As the image sensor, a CMOS (Complementary Metal-Oxide Semiconductor), a CCD (Charged Coupled Device), or the like is used.

A signal processing unit 112 processes an image signal captured by the imaging unit 111. For example, the signal processing unit 112 encodes an image captured by the imaging unit 111. As an encoding method, for example, JPEG (Joint Photographic Experts Group) can be used. A usable encoding method is not limited to this, as a matter of course. Well-known encoding processing such as H.264/MPEG-4 AVC (to be referred to as H.264 hereinafter) or HEVC (High Efficiency Video Coding) can be used. The signal processing unit 112 may be configured to perform encoding using an encoding method selected from a plurality of encoding methods by the user.

A driving control unit 113 controls to change the imaging direction and angle of view of the imaging unit 111. Note that the driving control unit 113 need not have a function of changing both the imaging direction and the angle of view. Alternatively, the imaging direction and angle of view of the imaging unit 111 may be fixed. A communication control unit 114 transmits, to the client apparatus 120, the captured image having undergone the processing in the signal processing unit 112. The communication control unit 114 receives, from the client apparatus 120, a control command to the imaging apparatus 110.

The client apparatus 120 will be described. A memory (storage unit) 121 saves a program to be executed by a CPU (control unit) 122 and various data to be used for processing currently executed by the CPU 122. By loading the program stored in the memory 121 and executing it, the CPU 122 performs, for example, processing (to be described later) of displaying object detection areas. An input information obtaining unit 124 accepts a user input to the input apparatus 130. A display control unit 125 outputs a video to the display apparatus 140 in accordance with an instruction from the CPU 122. Note that an example in which the control unit is implemented by the CPU 122 will be described. However, the control unit may be implemented using various other processors. Note that the CPU (control unit) 122 also has functions as an obtaining means, detection means, and evaluation means.

Figure 2:
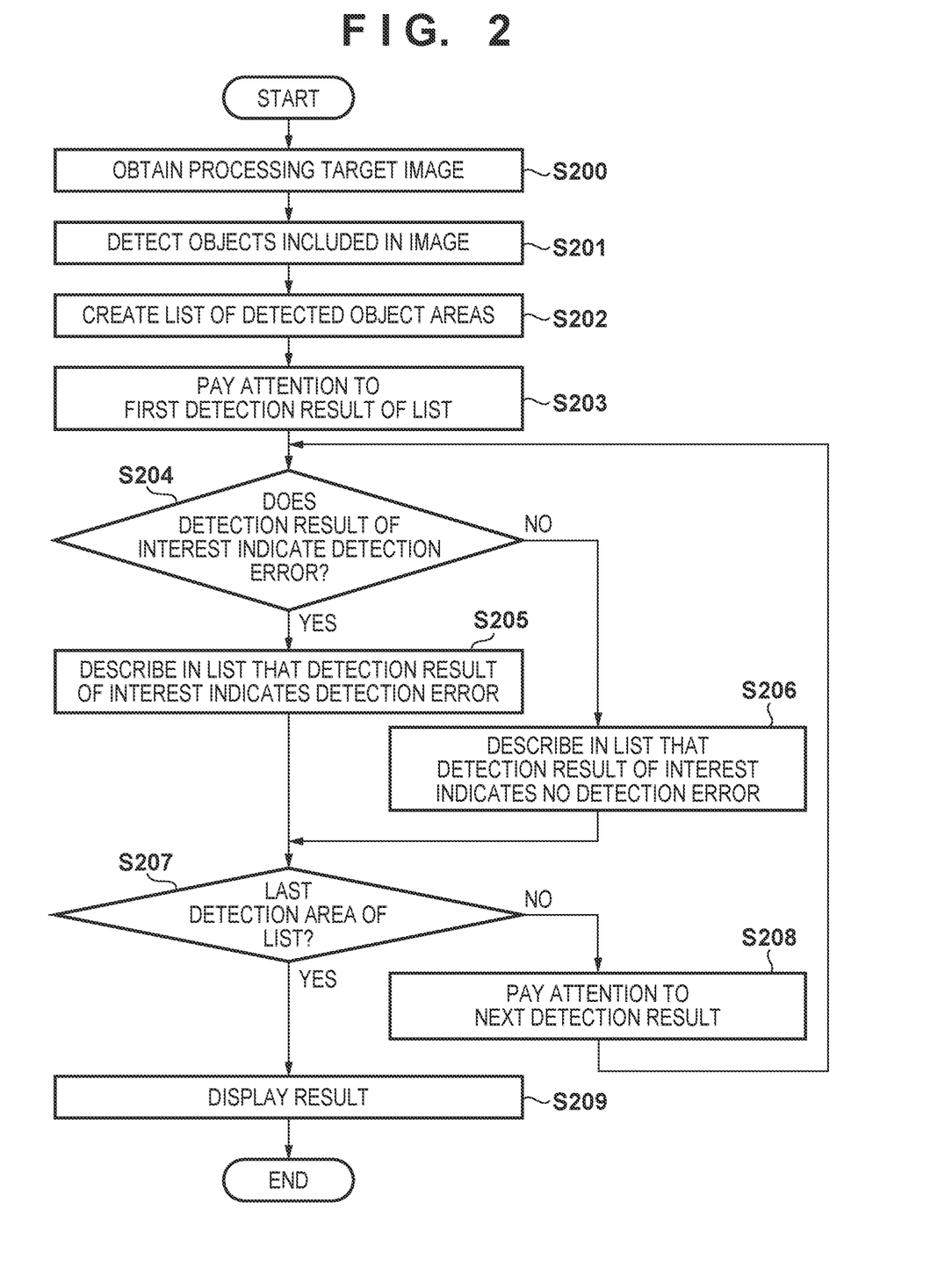
FIG. 2 is a flowchart illustrating object detection processing.

A processing procedure according to the first embodiment will be described next with reference to FIG. 2. FIG. 2 is a flowchart illustrating processing where the client apparatus 120 obtains a captured image from the imaging apparatus 110, detects object areas in the obtained captured image, and determines whether each of the detected areas (detection areas) has been erroneously detected. The processing shown in FIG. 2 is implemented when the CPU 122 of the client apparatus 120 executes the program stored in the memory 121.

Figure 3:
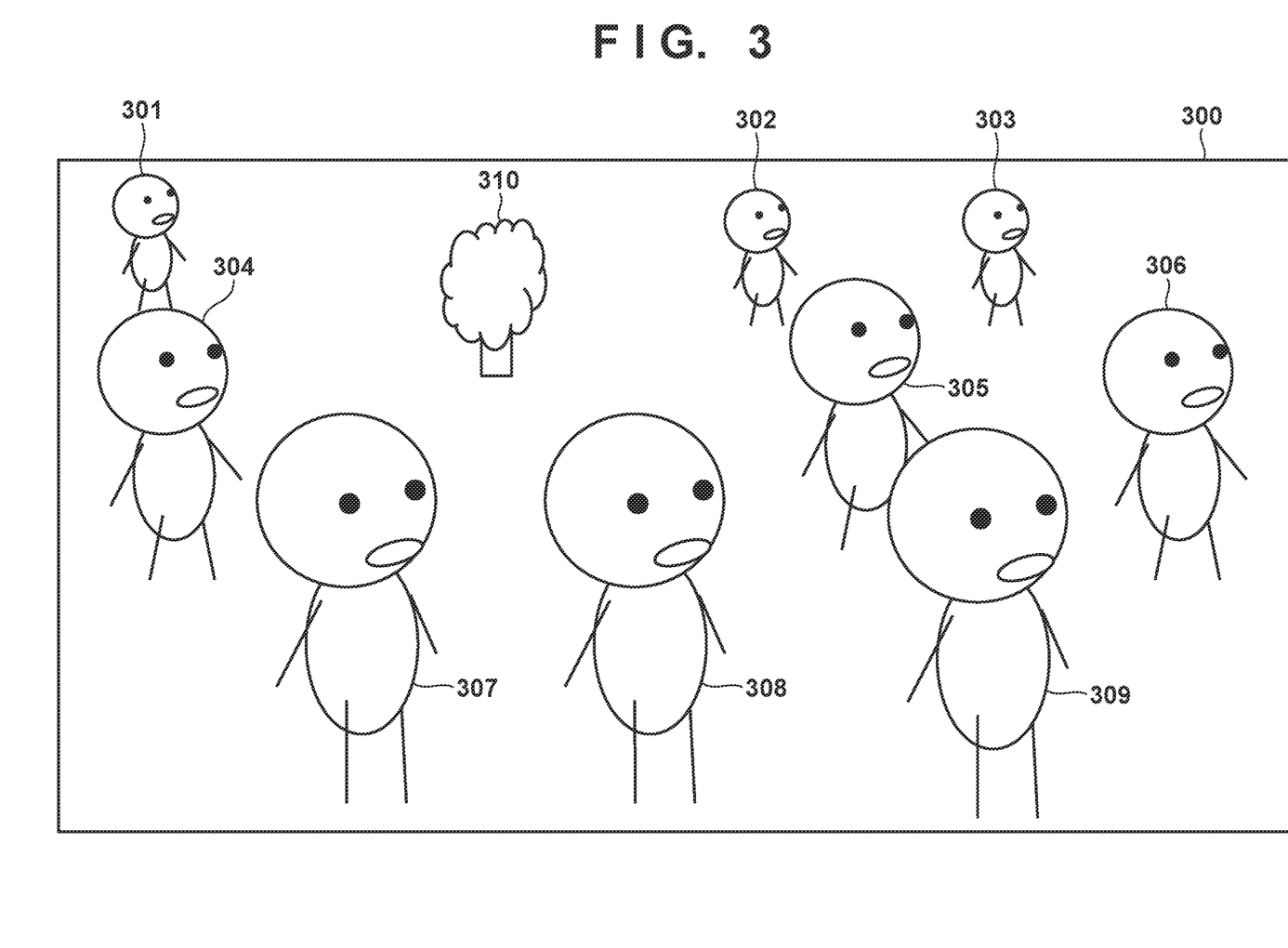
FIG. 3 is a view showing an example of a captured image obtained by an imaging apparatus 110.

First, the CPU 122 obtains, as a processing target image, a captured image from the imaging apparatus 110 via a communication control unit 123 (step S200). FIG. 3 is a view showing a captured image 300 obtained from the imaging apparatus 110 by the client apparatus 120. Referring to FIG. 3, objects 301 to 309 indicate human bodies as detection target objects according to this embodiment. Note that in this embodiment, human bodies are detected as objects. The present invention, however, is not limited to this. Instead of human bodies, for example, cars and the like may be detected. An object 310 indicates an object which is not a detection target in this embodiment. In this embodiment, assume that the non-detection target object 310 is a plant. In this embodiment, by performing the processing shown in FIG. 2 for the captured image obtained from the imaging apparatus 110, processing is performed for a real-time live video. However, the present invention is not limited to this. For example, the processing showing in FIG. 2 may be performed for each frame of a moving image saved in the imaging apparatus 110 or for each frame of a moving image saved in the client apparatus 120. Alternatively, the client apparatus 120 may access a recording server, and perform the processing shown in FIG. 2 for each frame of a moving image saved in the recording server.

The CPU 122 performs object detection processing of detecting, as detection areas, predetermined object areas from the captured image 300 obtained in step S200 (step S201). To perform object detection, in this embodiment, the CPU 122 performs scaling for the captured image 300 with various sizes. By performing scaling, it is possible to detect human bodies of various sizes. Next, the CPU 122 performs a raster scan using a detection window of a specific size in the captured image of each scale. The CPU 122 calculates in advance the feature amount of the object using learning data, and holds it. If the error between a feature amount calculated in the detection window at the time of the scan and the feature amount based on the learning data is smaller than a threshold, the CPU 122 determines the object.

Figure 4:
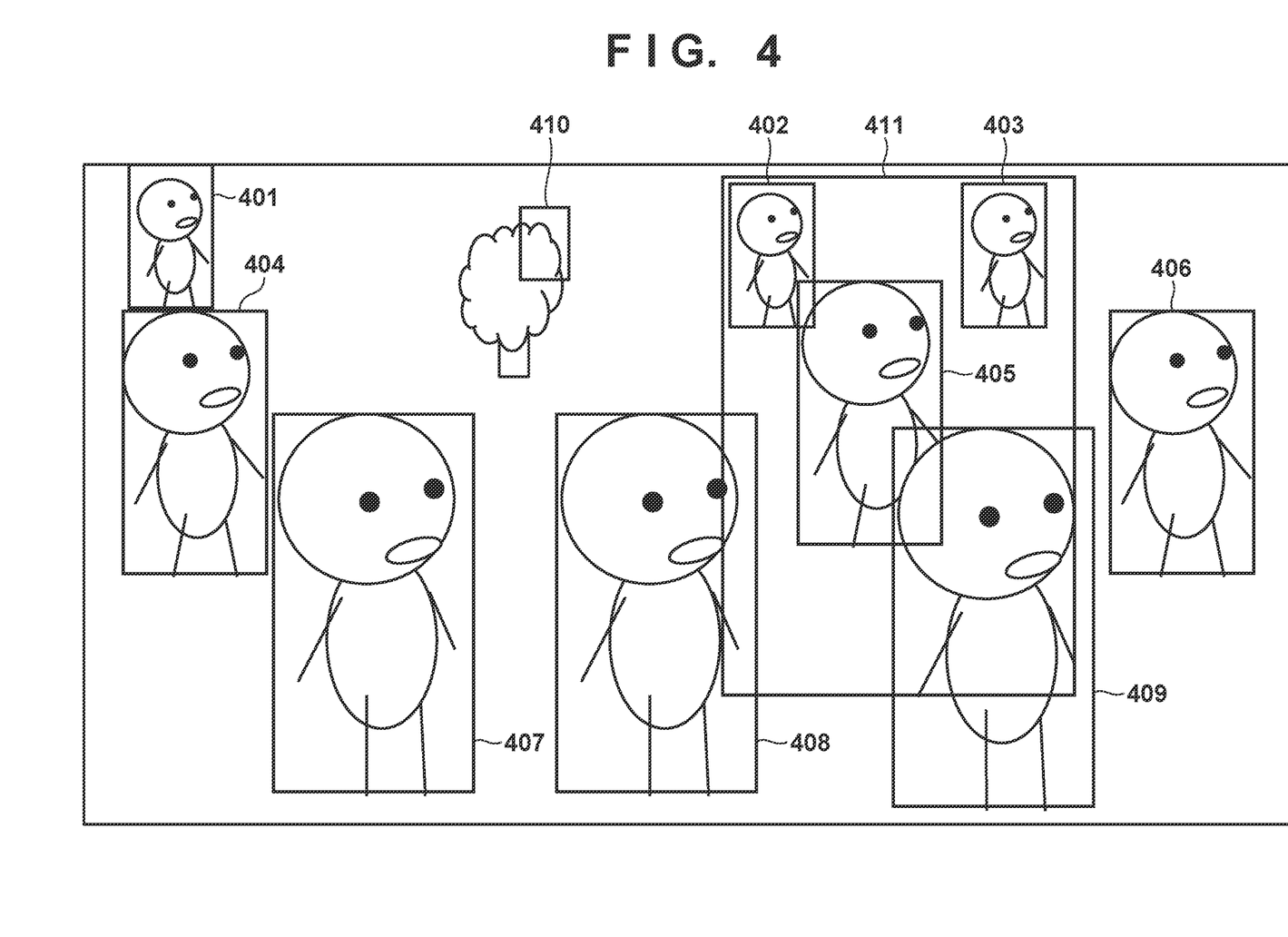
FIG. 4 is a view showing examples of object detection results in the captured image.

FIG. 4 shows a result of performing object detection for the captured image 300. Referring to FIG. 4, detection areas 401 to 409 indicate areas in which the objects 301 to 309 have been detected. Detection areas 410 and 411 indicate erroneously detected areas. The erroneously detected detection area 410 is a result obtained when a portion having a feature close to the detection target object is included in part of the plant and appears as a small detection error. The erroneously detected detection area 411 is an example in which an area densely including a plurality of people has a feature close to the detection target object and appears as a large detection error.

The CPU 122 creates a list of detected object areas (detection areas) (step S202). Each node of the list stores the size and central coordinates of the detected object area (detection area). In the example shown in FIG. 4, the list stores the size and central coordinates of each of rectangles representing the detection areas 401 to 411.

The CPU 122 determines whether each detection area of the list has been erroneously detected while scanning the list created in step S202 (steps S203 to S208). The procedure of processing of determining whether each detection area has been erroneously detected is as follows.

Processing 1: Attention is paid to one of the detection areas stored in the list (steps S203 and S208).

Processing 2: By comparing the detection area (evaluation target detection area) of interest with a plurality of other detection areas, the detection area of interest is evaluated, and it is determined based on the evaluation result whether the detection area has been erroneously detected (step S204). Evaluation is performed for a predetermined feature amount of the detection area of interest based on the degrees of deviation with respect to predetermined feature amounts of the plurality of other detection areas. In this embodiment, the size of each detection area is used as a feature amount, and the size of the detection area of interest is compared with the sizes of other detection areas. If the sizes are largely different, it is determined that the detection area has been erroneously detected.

In this embodiment, other detection areas whose sizes are compared with that of the detection area of interest are limited to detection areas existing at the same depth as the detection area of interest. This prevents large differences in size with respect to other detection areas from appearing when it is determined that the detection area of interest has not been erroneously detected. In this embodiment, a detection area whose positional difference in the depth direction with respect to the detection area of interest falls within a predetermined range is used as a comparison target. In this embodiment, a detection area whose difference in coordinate value in the vertical direction in the captured image with respect to the position of the detection area of interest falls within a predetermined range is used as a comparison target. More specifically, in this embodiment, when y' represents the y-coordinate of the center of the detection area of interest, an area on the captured image, whose center has a y-coordinate falling within a range of y'−β (inclusive) to y'+α (inclusive), is used as an area in which an object area having the same depth as the object area of interest exists.

Figure 5:
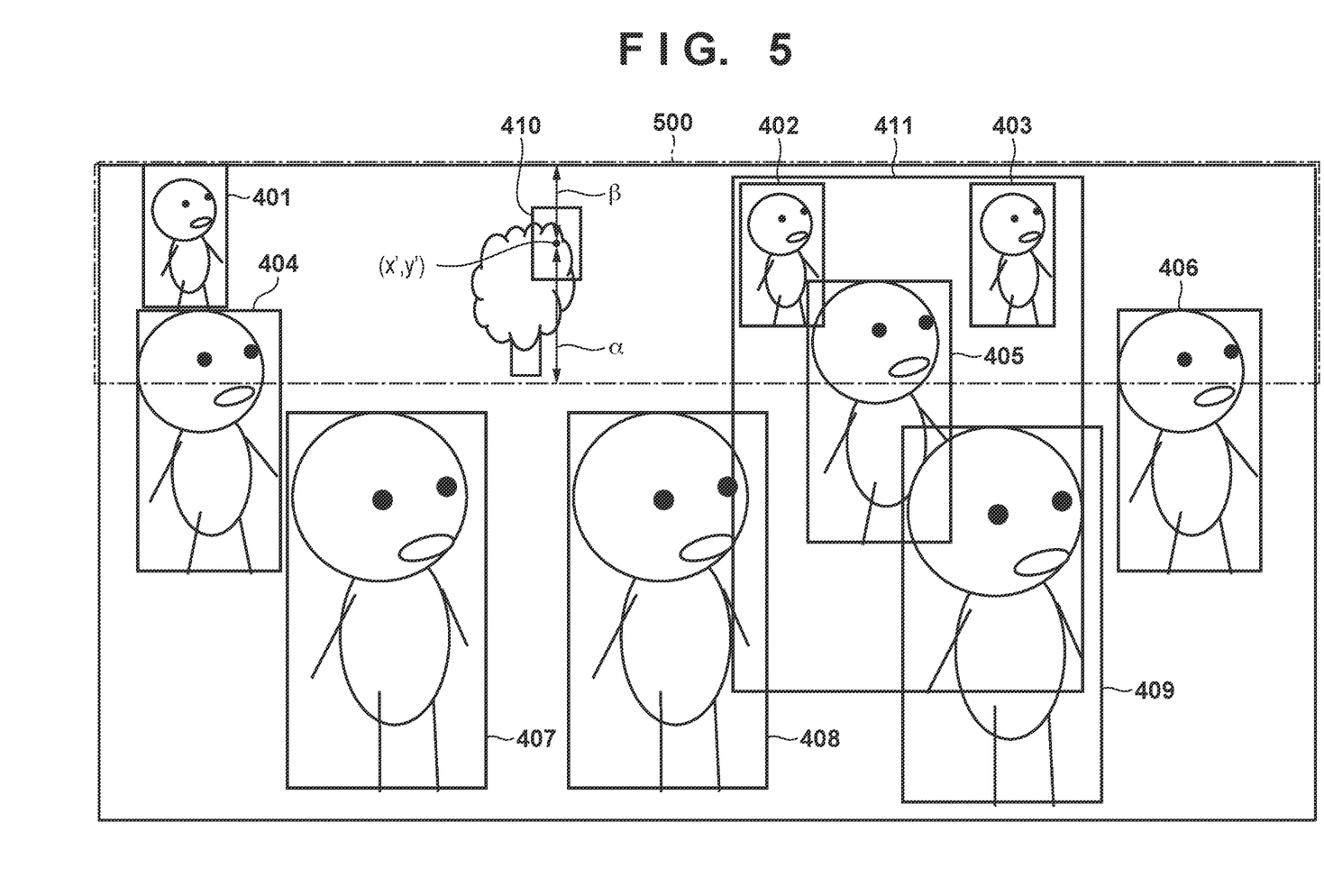
FIG. 5 is a view showing an object area of interest and comparison target object areas.

The above processing will be described with reference to FIG. 5. A rectangle 500 represented by one-dot dashed lines in FIG. 5 defines an area for limiting other detection areas to be used for comparison when attention is paid to the detection area 410. The upper side of the rectangle 500 is located at a position of y'−β and the lower side of the rectangle 500 is located at a position of y'+α. The rectangle 500 represents a boundary indicating whether an area exists at the same depth as the detection area 410. That is, it is determined that the detection areas 401 to 403 whose central coordinates fall inside the rectangle 500 exist at the same depth as the detection area 410, and that the detection areas 404 to 409 and 411 do not exist at the same depth. That is, in FIG. 5, the detection area of interest is the detection area 410, and other detection areas whose sizes are compared with that of the detection area 410 are the detection areas 401 to 403.

In this embodiment, different values are set as α and β described above for each y-coordinate of the captured image. As a setting method, for example, when P represents a point, on the floor in a real space, at each y-coordinate of the captured image, coordinate points on the captured image corresponding to a point 5 m away from P on the camera side and a point 5 m away from P on the opposite side are measured in advance, and managed in a table. At this time, when A represents the coordinate point on the captured image corresponding to the point 5 m away on the camera side and B represents the coordinate point 5 m away on the opposite side, a y-coordinate yA of A is given by y'+α and a y-coordinate yB of B is given by y'−β. Note that the above method is merely an example, and the present invention is not limited to this. For example, the points 5 m away from the point P on the camera side and the opposite side are used. The present invention is not limited to 5 m, and the distances to the points on the camera side and the opposite side need not be equal to each other. Furthermore, α and β may be determined by constant pixel values regardless of the y-coordinate, and α=β may be set. For example, regardless of the y-coordinate, each of α and β may be fixed to 10 pixels.

In addition, in this embodiment, as other detection areas whose sizes are compared with that of the detection area of interest, detection areas existing at the same depth as the detection area of interest are used. The present invention, however, is not limited to this. For example, in a captured image obtained by capturing stairs, the sizes of object areas are almost equal to each other regardless of the y-coordinate in the image. In this case, for other detection areas which are compared with the detection area of interest, all the detection areas other than the detection area of interest may be used, or a predetermined number of detection areas may be selected in ascending order of distance from the detection area of interest and used. Alternatively, detection areas falling inside a figure set in accordance with the position of the detection area of interest in the captured image may be selected as other detection areas serving as comparison targets. For example, detection areas falling inside the boundary which can be defined by a circle or ellipse having the detection area of interest as the center may be set as comparison targets.

As described above, as a result of evaluation, the degrees of deviation of the predetermined feature amount (the size in this embodiment) of the detection area of interest with respect to the predetermined feature amounts of the plurality of other detection areas are evaluated, and it is determined based on the evaluation result whether the detection area of interest has been erroneously detected. In this embodiment, a standard deviation is used to evaluate the degrees of deviation. That is, in this embodiment, if the detection area of interest has large differences in size with respect to other detection areas, it is determined that the detection area of interest has been erroneously detected. For this determination processing, outlier detection is performed based on the standard deviation. More specifically, a Gaussian distribution is created by the sizes of the plurality of other detection areas (detection areas other than the detection area of interest). If the size of the detection area of interest is different from the average of the Gaussian distribution by 2σ or more, it is determined that the detection area of interest has been erroneously detected; otherwise, it is determined that the detection area of interest has been correctly detected. Note that σ represents the standard deviation.

The above processing will be described with reference to FIG. 5. For example, if attention is paid to the detection area 410, the boundary indicating whether each detection area exists at the same depth is represented by the rectangle 500. The detection areas 401, 402, 403, and 410 whose central coordinates fall inside the rectangle 500 are determined as detection areas existing at the same depth. Assume that the sizes of the detection areas 401, 402, 403, and 410 are 97, 100, 103, and 90, respectively. If the detection area of interest is the detection area 410, the average of the Gaussian distribution by the remaining detection areas 401 to 403 is 100, and the standard deviation σ is 2.45. Therefore, if the size of the detection area of interest falls within the range of 95.10 (inclusive) to 104.90 (exclusive), it is determined that the detection area of interest has not been erroneously detected. Since the size of the detection area 410 is 90 and falls outside the above range, it is determined that the detection area 410 has been erroneously detected.

Assume that when the list is scanned and attention is paid to the detection area 401, it is determined that the remaining detection areas 402, 403, and 410 exist at the same depth. In this case, the average of the Gaussian distribution of the sizes of the remaining detection areas 402, 403, and 410 is 97.67, and the standard deviation is 5.56. Since the size of the detection area 401 of interest is 97 and falls within the range of 86.55 (inclusive) to 108.79 (inclusive), it is determined that the detection area 401 has not been erroneously detected.

Note that in this embodiment, detection areas obtained as a result of performing detection for an image for which object detection is currently performed are used as detection areas used as other detection areas. The present invention, however, is not limited to this. For example, if the captured image for which object detection is currently performed includes a small number of objects, a result of performing detection for a past image may be used. This can be implemented by registering the size and central coordinates of each of detected detection areas in the past captured image. Furthermore, in this embodiment, outlier detection is performed based on the standard deviation. The present invention, however, is not limited to this. Outlier detection based on a distance (difference with respect to the average value) may be used, or a correct size may be obtained from correct detection data by machine learning.

If, as a result of performing the above processing (step S204), it is determined that the detection area of interest has been erroneously detected, the CPU 122 describes in the list that the detection area of interest has been erroneously detected (step S205); otherwise, the CPU 122 describes in the list that the detection area of interest has not been erroneously detected (step S206). The CPU 122 determines whether attention is paid to the last detection area of the list (step S207). If no attention is paid to the last detection area of the list, attention is paid to the next detection area (step S208), and the process returns to step S204. In this way, it is sequentially determined whether each of the detection areas registered in the list has been erroneously detected. If it is determined in step S207 that attention is paid to the last detection area of the list, the processing of determining whether each detection area in the list has been erroneously detected ends.

After that, in step S209, the CPU 122 displays, together with the detection results of the detection target objects, the captured image 300 on the display apparatus 140 using the display control unit 125. For example, the CPU 122 superimposes and displays frames each indicating the detection area on the captured image, as shown in FIG. 4. At this time, however, the frame of the detection area which has been determined as an erroneously detected detection area is set in a non-display state. For example, in FIG. 4, the rectangular frames of the detection areas 401 to 409 are superimposed and displayed, and the rectangular frames of the detection areas 410 and 411 are not displayed. Note that the frame of each detection area is not limited to the rectangle, and an ellipse or the like may be used.

Second Embodiment

The first embodiment has explained a mode in which the frame of a detection area determined as an erroneously detected detection area is not displayed in presenting the detection results of the detection areas in the captured image. Therefore, the user can see the correctly detected detection areas but cannot grasp whether there is a detection area determined as an erroneously detected detection area. In the second embodiment, display is performed so that the user can grasp an erroneously detected detection area.

In step S209, with reference to the list of detection areas, the CPU 122 displays, on the display apparatus 140, a result of determining whether each detection area has been erroneously detected. In the second embodiment, whether each detection result indicates a detection error is indicated by displaying, by a symbol, on a captured image 300, a result of determining whether each detection area has been erroneously detected.

Figure 6:
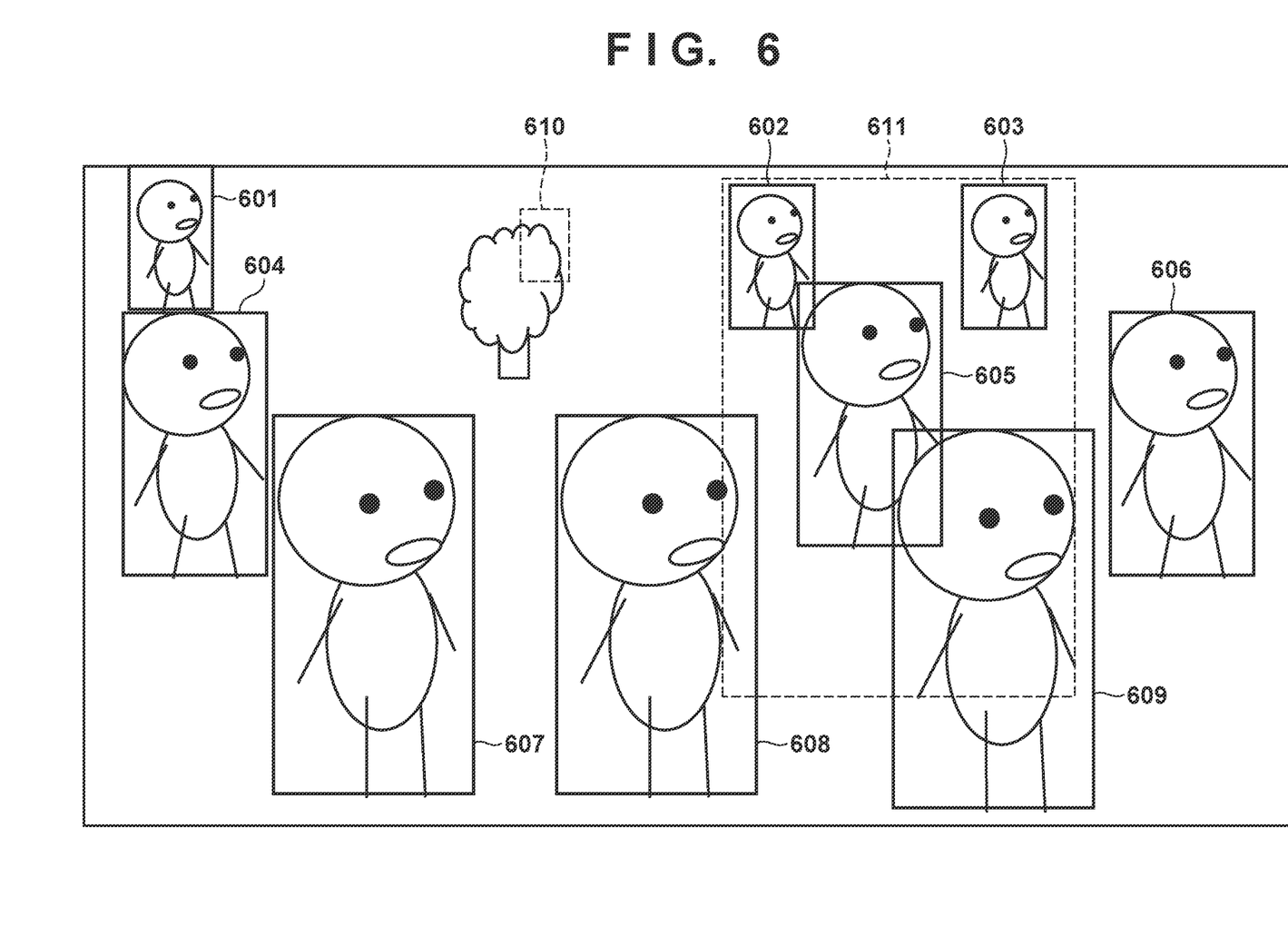
FIG. 6 is a view showing an example of a captured image on which symbols each indicating a detection error and symbols each indicating no detection error are superimposed.

FIG. 6 shows a captured image 600 obtained by superimposing, on the captured image 300, symbols each indicating whether each detection area has been erroneously detected. In FIG. 6, solid line rectangles 601 to 609 are symbols indicating normally detected detection areas which have not been erroneously detected (detection areas which have not been determined as erroneously detected detection areas). Furthermore, broken line rectangles 610 and 611 are symbols indicating erroneously detected detection areas. Note that in the second embodiment, the types of lines indicate whether each detection area has been erroneously detected. The present invention, however, is not limited to this. For example, as a method of indicating whether each detection area has been erroneously detected, different colors may be used, or different frame shapes to be superimposed, such as a rectangle and ellipse, may be used. Alternatively, a character string indicating whether each detection area has been erroneously detected may be displayed.

Note that as described in the first embodiment, the standard deviation is used to determine whether each detection area has been erroneously detected, and it is thus possible to quantitatively determine the degree of a detection error. Therefore, for example, it is possible to represent the likelihood of a detection error by changing the form of a symbol depending on whether the size of the detection area of interest is different from the average of the Gaussian distribution generated from the sizes of other detection areas by an amount equal to or larger than $2\sigma$ or by an amount equal to or larger than $3\sigma$. It is possible to represent the likelihood of a detection error by the color of a symbol by using, for example, yellow if the size is different by an amount equal to or larger than $2\sigma$ and red if the size is different by an amount equal to or larger than $3\sigma$. The change of the form of the symbol is not limited to the color, as a matter of course. For example, the change of the shape of the symbol or the change of the line (solid line, broken line, or the like) indicating the boundary of the symbol (figure) can be used.

As described above, according to each of the above-described embodiments, it is possible to reduce detection errors of object detection results by determining whether each object detection result in a captured image indicates a detection error.

Although the preferred embodiments of the present invention have been described above, the present invention is not limited to them, and various modifications and changes can be made within the scope of the present invention. For example, an output unit for outputting the number of detection areas each modified based on the evaluation result in the processes in steps S203 to S208 may be provided. The output unit is, for example, a display control unit 125 for displaying the number of modified detection areas on the display apparatus 140. Alternatively, the output unit may be a communication unit for outputting, to an external apparatus, information indicating the number of modified detection areas. If, for example, the number of detection areas included in the captured image 300 is 10 and, as a result of the processes in steps S203 to S208, it is determined that two of the detection areas have been erroneously detected, the output unit outputs information indicating "8".

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-203031, filed Oct. 14, 2016, which is hereby incorporated by reference herein in its entirety.

What is claimed is:

1. An information processing apparatus comprising:
an obtaining unit configured to obtain a given image captured by an imaging unit;
a detection unit configured to perform object detection for detecting an object area in the given image;
a calculation unit configured to calculate deviation of a target object area from a plurality of other object areas, by comparing a size of the target object area with a value which is based on sizes of the plurality of other object areas, wherein the target object area and the plurality of other object areas are detected by the detection unit from the given image;
a determination unit configured to determine whether the deviation of the target object area is greater than or equal to a predetermined criterion; and
an output unit configured to output information indicating a result of the object detection in the given image, wherein the target object area is excluded from the result if the deviation of the target object area is greater than or equal to the predetermined criterion.

2. The information processing apparatus according to claim 1, wherein the plurality of other object areas are object areas whose positional differences in a depth direction with respect to the target object area fall within a predetermined range.

3. The information processing apparatus according to claim 1, wherein the plurality of other object areas are object areas whose differences in coordinate value in a vertical direction in the given image with respect to the target object area fall within a predetermined range.

4. The information processing apparatus according to claim 1, wherein the plurality of other object areas are object areas other than the target object area in the given image.

5. The information processing apparatus according to claim 1, wherein the plurality of other object areas are a predetermined number of object areas selected in ascending order of distance from the target object area in the given image.

6. The information processing apparatus according to claim 1,
wherein the result includes the target object area if the deviation of the target object area is less than the predetermined criterion.

7. The information processing apparatus according to claim 1, further comprising
a processing unit configured to perform superimposing processing for superimposing a symbol representing the target object area on the given image such that the given image on which the symbol is superimposed is displayed, if the deviation of the target object area is less than the predetermined criterion,
wherein the processing unit does not perform the superimposing processing for superimposing the symbol on the given image, if the deviation of the target object area is greater than or equal to the predetermined criterion.

8. A method for information processing, comprising:
obtaining a given image captured by an imaging unit;
performing object detection for detecting an object area in the given image;
calculating deviation of a target object area from a plurality of other object areas, by comparing a size of the target object area with a value which is based on sizes of the plurality of other object areas, wherein the target object area and the plurality of other object areas are detected from the given image;
determining whether the deviation of the target object area is greater than or equal to a predetermined criterion; and
outputting information indicating a result of the object detection in the given image, wherein the target object area is excluded from the result if the deviation of the target object area is greater than or equal to the predetermined criterion.

9. The method according to claim 8, wherein the plurality of other object areas are object areas whose positional differences in a depth direction with respect to the target object area fall within a predetermined range.

10. The method according to claim 8, wherein the plurality of other object areas are object areas whose differences in coordinate value in a vertical direction in the given image with respect to the target object area fall within a predetermined range.

11. The method according to claim 8, wherein the plurality of other object areas are object areas other than the target object area in the given image.

12. The method according to claim 8, wherein the plurality of other object areas are a predetermined number of object areas selected in ascending order of distance from the target object area in the given image.

13. The method according to claim 8, wherein the result includes the target object area if the deviation of the target object area is less than the predetermined criterion.

14. The method according to claim 8, further comprising
performing superimposing processing for superimposing a symbol representing the target object area on the given image such that the given image on which the symbol is superimposed is displayed, if the deviation of the target object area is less than the predetermined criterion,
wherein the superimposing processing for superimposing the symbol representing the target object area on the given image is not performed, if the deviation of the target object area is greater than or equal to the predetermined criterion.

15. A non-transitory computer readable storage medium storing a program for causing a computer to function as an information processing apparatus comprising:
an obtaining unit configured to obtain a given image captured by an imaging unit, a detection unit configured to perform object detection for detecting an object area in the given image, a calculation unit configured to calculate deviation of a target object area from a plurality of other object areas, by comparing a size of the target object area with a value which is based on sizes of the plurality of other object areas, wherein the target object area and the plurality of other object areas are detected by the detection unit from the given image;

a determination unit configured to determine whether the deviation of the target object area is greater than or equal to a predetermined criterion; and an output unit configured to output information indicating a result of the object detection in the given image, wherein the target object area is excluded from the result if the deviation of the target object area is greater than or equal to the predetermined criterion.

16. An information processing apparatus comprising:

an obtaining unit configured to obtain a captured image captured by an imaging unit;

a detection unit configured to perform object detection for detecting an object in the captured image; and a processing unit configured to perform superimposing processing for superimposing a symbol representing a target object on the captured image such that the captured image on which the symbol is superimposed is displayed, wherein an appearance of the symbol is different based on deviation of a size of the target object from sizes of a plurality of other objects and wherein the target object and the plurality of other objects are detected from the captured image.

17. The information processing apparatus according to claim 16, wherein the plurality of other objects are objects whose positional differences in a depth direction with respect to the target object fall within a predetermined range.

18. The information processing apparatus according to claim 16, wherein the plurality of other objects are objects whose differences in coordinate value in a vertical direction in the captured image with respect to the target object fall within a predetermined range.

19. The information processing apparatus according to claim 16, further comprising a determination unit configured to determine whether the deviation of the size of the target object from sizes of a plurality of the other objects is greater than or equal to a predetermined criterion.

20. The information processing apparatus according to claim 19, wherein a color of the symbol is a first color if the deviation of the size of the target object is greater than or equal to the predetermined criterion, and wherein the color of the symbol is a second color which is different form the first color if the deviation of the size of the target object is less than the predetermined criterion.

21. A method for information processing, comprising:

obtaining a captured image captured by an imaging unit;

performing object detection for detecting an object in the captured image; and performing superimposing processing for superimposing a symbol representing a target object on the captured image such that the captured image on which the symbol is superimposed is displayed, wherein an appearance of the symbol is different based on deviation of a size of the target object from sizes of a plurality of other objects and wherein the target object and the plurality of other objects are detected from the captured image.

22. The method according to claim 21, further comprising determining whether the deviation of the size of the target object from sizes of a plurality of the other objects is greater than or equal to a predetermined criterion.

23. The method according to claim 22, wherein a color of the symbol is a first color if the deviation of the size of the target object is greater than or equal to the predetermined criterion, and wherein the color of the symbol is a second color which is different form the first color if the deviation of the size of the target object is less than the predetermined criterion.

24. The method according to claim 21, wherein the plurality of other objects are objects whose positional differences in a depth direction with respect to the target object fall within a predetermined range.

25. The method according to claim 21, wherein the plurality of other objects are objects whose differences in coordinate value in a vertical direction in the captured image with respect to the target object fall within a predetermined range.

26. A non-transitory computer readable storage medium storing a program for causing a computer to function as an information processing apparatus comprising:

an obtaining unit configured to obtain a captured image captured by an imaging unit;

a detection unit configured to perform object detection for detecting an object in the captured image; and a processing unit configured to perform superimposing processing for superimposing a symbol representing a target object on the captured image such that the captured image on which the symbol is superimposed is displayed, wherein an appearance of the symbol is different based on deviation of a size of the target object from sizes of a plurality of other objects and wherein the target object and the plurality of other objects are detected from the captured image.

* * * * *